United States Patent
Singh et al.

(10) Patent No.: US 10,914,362 B2
(45) Date of Patent: Feb. 9, 2021

(54) MODULAR MOTOR VEHICLE HYBRID TRANSMISSION CONVERTIBLE BETWEEN SIX, EIGHT, AND NINE SPEEDS

(71) Applicants: Tejinder Singh, Dexter, MI (US); John C Collins, Lake Orion, MI (US)

(72) Inventors: Tejinder Singh, Dexter, MI (US); John C Collins, Lake Orion, MI (US)

(73) Assignee: FCA US LLC, Auburn Hills, MI (US)

( * ) Notice: Subject to any disclaimer, the term of this patent is extended or adjusted under 35 U.S.C. 154(b) by 42 days.

(21) Appl. No.: 16/455,076

(22) Filed: Jun. 27, 2019

(65) Prior Publication Data
US 2020/0406739 A1 Dec. 31, 2020

(51) Int. Cl.
*F16H 3/66* (2006.01)
*F16H 57/00* (2012.01)

(52) U.S. Cl.
CPC ....... *F16H 3/66* (2013.01); *F16H 2057/0075* (2013.01); *F16H 2200/006* (2013.01); *F16H 2200/0021* (2013.01); *F16H 2200/0052* (2013.01); *F16H 2200/0065* (2013.01); *F16H 2200/0086* (2013.01); *F16H 2200/2012* (2013.01); *F16H 2200/2043* (2013.01); *F16H 2200/2046* (2013.01);
(Continued)

(58) Field of Classification Search
CPC ............... F16H 3/66; F16H 2200/0086; F16H 2200/0021; F16H 2200/2012; F16H 2200/006; F16H 2200/0052; F16H 2200/2048; F16H 2200/2046; F16H 2200/0065; F16H 2200/2066; F16H 2200/2082; F16H 2200/2043

USPC ................... 475/275–291; 29/401.1
See application file for complete search history.

(56) References Cited

U.S. PATENT DOCUMENTS

| 3,971,268 | A | * | 7/1976 | Murakami | ................ F16H 3/66 475/276 |
| 3,999,448 | A | * | 12/1976 | Murakami | .............. F16H 3/666 475/276 |
| 6,071,208 | A | | 6/2000 | Koivunen | |

(Continued)

FOREIGN PATENT DOCUMENTS

| DE | 102013220354 A1 | 4/2014 |
| KR | 101470203 B1 | 12/2014 |

(Continued)

*Primary Examiner* — Roger L Pang
(74) *Attorney, Agent, or Firm* — Ralph E Smith

(57) ABSTRACT

A modular hybrid transmission configurable between a 9-speed configuration and an 8-speed configuration includes first, second, third, and fourth planetary gear sets each having first, second, and third elements. Seven torque transmitting devices are each selectively engageable to interconnect one of the first, second, and third elements of one of the planetary gear sets directly with (i) one of the first, second, and third elements of another one of the planetary gear sets, (ii) a housing, or (iii) an input member. The seven torque transmitting devices are selectively engageable to establish nine forward speed ratios and at least one reverse speed ratio. Upon removal of a fourth torque transmitting device, the transmission is arranged in the 8-speed configuration and the remaining six torque transmitting devices are selectively engageable to establish eight forward speed ratios and at least one reverse speed ratio.

19 Claims, 7 Drawing Sheets

(52) U.S. Cl.
CPC ............... *F16H 2200/2048* (2013.01); *F16H 2200/2066* (2013.01); *F16H 2200/2082* (2013.01)

(56) References Cited

U.S. PATENT DOCUMENTS

| | | |
|---|---|---|
| 7,118,510 B2 | 10/2006 | Raghavan et al. |
| 7,337,051 B2 | 2/2008 | Ota et al. |
| 7,686,732 B2 | 3/2010 | Raghavan et al. |
| 7,727,103 B2 | 6/2010 | Seo |
| 8,979,700 B2 | 3/2015 | Singh |
| 9,091,330 B2 | 7/2015 | Singh |
| 9,222,560 B2 | 12/2015 | Singh et al. |
| 9,447,847 B2 | 9/2016 | Eo et al. |
| 9,587,718 B1 | 3/2017 | Kim et al. |
| 9,618,093 B1 | 4/2017 | Lee et al. |
| 9,638,290 B1 | 5/2017 | Kim et al. |
| 9,670,994 B2 | 6/2017 | Park et al. |
| 9,777,803 B2 | 10/2017 | Kwon et al. |
| 9,784,341 B2 | 10/2017 | Park et al. |
| 9,822,857 B2 | 11/2017 | Park et al. |
| 2009/0221394 A1* | 9/2009 | Phillips ................... F16H 3/663 475/213 |
| 2010/0331138 A1* | 12/2010 | Phillips ................... F16H 3/66 475/278 |
| 2012/0196718 A1* | 8/2012 | Hart ....................... F16H 3/66 475/271 |
| 2015/0274154 A1 | 10/2015 | Tsuda et al. |
| 2018/0094700 A1 | 4/2018 | Kim et al. |
| 2018/0208040 A1 | 7/2018 | Singh et al. |

FOREIGN PATENT DOCUMENTS

| | | |
|---|---|---|
| KR | 101563586 B1 | 10/2015 |
| KR | 101755816 B1 | 7/2017 |
| WO | 2017134950 A1 | 8/2017 |

\* cited by examiner

| 9 Speed | B1 | B2 | B3 | C1 | C2 | C3 | C4 | Ratio | Step |
|---|---|---|---|---|---|---|---|---|---|
| 1 | ● | ● | | | | | | 4.800 | |
| 2 | ● | | ● | | | | | 2.811 | 1.708 |
| 3 | ● | | | | | | ● | 2.200 | 1.278 |
| 4 | ● | | | ● | | | | 1.745 | 1.261 |
| 5 | ● | | | | | ● | | 1.478 | 1.180 |
| 6 | | | | | ● | | | 1.333 | 1.109 |
| 7 | | | | ● | ● | | | 1.000 | 1.333 |
| 8 | | | ● | | ● | | | 0.765 | 1.307 |
| 9 | | | ● | | | ● | | 0.595 | 1.286 |
| Rev1 | | ● | | ● | | | | -3.258 | -0.679 |
| Rev2 | | ● | | | | ● | | -0.724 | -0.151 |

FIG. 4

| 8 Speed | B1 | B2 | B3 | C1 | C2 | C3 | Ratio | Step |
|---|---|---|---|---|---|---|---|---|
| 1 | ● | ● | | | | | 4.800 | |
| 2 | ● | | ● | | | | 2.811 | 1.708 |
| 3 | ● | | | ● | | | 1.745 | 1.611 |
| 4 | ● | | | | | ● | 1.478 | 1.180 |
| 5 | | | | ● | ● | | 1.333 | 1.109 |
| 6 | | | | | ● | | 1.000 | 1.333 |
| 7 | | | ● | | ● | | 0.765 | 1.307 |
| 8 | | | ● | | | ● | 0.595 | 1.286 |
| Rev1 | | ● | | ● | | | -3.258 | -0.679 |
| Rev2 | | ● | | | | ● | -0.724 | -0.151 |

FIG. 6

| 6 Speed | B1 | B2 | B3 | C1 | C2 | Ratio | Step |
|---|---|---|---|---|---|---|---|
| 1 | ● | ● | | | | 4.800 | |
| 2 | ● | | ● | | | 2.811 | 1.708 |
| 3 | ● | | | ● | | 1.745 | 1.611 |
| 4 | ● | | | | ● | 1.333 | 1.309 |
| 5 | | | | ● | ● | 1.000 | 1.333 |
| 6 | | | ● | ● | | 0.765 | 1.307 |
| Rev1 | | ● | | | ● | -3.258 | -0.679 |

FIG. 8

MODULAR MOTOR VEHICLE HYBRID TRANSMISSION CONVERTIBLE BETWEEN SIX, EIGHT, AND NINE SPEEDS

FIELD

The present application relates generally to an automatic transmission for a vehicle and, more particularly, to a clutch and gear arrangement to configurably provide six, eight, or nine speeds.

BACKGROUND

Current hybrid automatic transmissions are often very complex assemblies that include multiple electric motors, compound planetary gear sets and over six clutches or brakes. Such assemblies are expensive to develop and manufacture, and are often oversized from both an overall size and a capacity perspective. Such hybrid transmissions can be too large for vehicles in which they are desired to be incorporated and/or may be over-capacitized for vehicles in which they are incorporated, thereby potentially cutting into fuel economy savings with extra weight and/or inefficiencies due to the transmission complexity. This can also result in unnecessary cost and weight being associated with such vehicles. Thus, while such hybrid transmissions do work well for their intended purpose, there remains a desire for improvement in the relevant art.

SUMMARY

In accordance with one example aspect of the invention, a modular transmission configurable between a 9-speed configuration and an 8-speed configuration is provided. In one exemplary implementation, the transmission includes an housing, an input member, an output member, and first, second, third, and fourth planetary gear sets each having first, second, and third elements. The transmission further includes seven torque transmitting devices each selectively engageable to interconnect one of the first, second, and third elements of one of the planetary gear sets directly with (i) one of the first, second, and third elements of another one of the planetary gear sets, (ii) the housing, or (iii) the input member. A plurality of connecting members each connect one of the first, second, and third members of one of the planetary gear sets directly with another one of the first, second, and third members of another one of the planetary gear sets or with one of the torque transfer devices. The seven torque transmitting devices are selectively engageable in combinations of two with the four planetary gear sets to establish nine forward speed ratios and at least one reverse speed ratio. Upon removal of a fourth torque transmitting device of the seven torque transmitting devices, the transmission is arranged in the 8-speed configuration and the remaining six torque transmitting devices are selectively engageable in combinations of two with the four planetary gear sets to establish eight forward speed ratios and at least one reverse speed ratio.

In addition the foregoing, the described transmission may include one or more of the following features: wherein the transmission is further configurable into a 6-speed configuration upon removal of (i) a third torque transmitting device of the seven torque transmitting devices, (ii) the fourth torque transmitting device, and (iii) the fourth planetary gear set, wherein in the 6-speed configuration, the remaining five torque transmitting devices are selectively engageable in combinations of two with the three remaining planetary gear sets to establish six forward speed ratios and at least one reverse speed ratio.

In addition the foregoing, the described transmission may include one or more of the following features: wherein the planetary gear set first members are sun gears, the planetary gear set second members are carriers, and the planetary gear set third members are ring gears; wherein the seven torque transmitting devices include four rotating clutches and three brake clutches; wherein the fourth torque transmitting device is one of the four rotating clutches; wherein one of the three brake clutches is a selectable one way clutch.

In addition the foregoing, the described transmission may include one or more of the following features: wherein a first connecting member of the plurality of connecting members connects the first planetary gear set sun gear to a fifth torque transmitting device of the seven torque transmitting devices; wherein a second connecting member of the plurality of connecting members connects the first planetary gear set ring gear with the second planetary gear set carrier; wherein a third connecting member of the plurality of connecting members connects the first planetary gear set carrier with the fourth torque transmitting device; wherein a fourth connecting member of the plurality of connecting members connects the first planetary gear set carrier with the output member.

In addition the foregoing, the described transmission may include one or more of the following features: wherein a fifth connecting member of the plurality of connecting members connects the second planetary gear set ring gear with (i) the fourth planetary gear set ring gear, and (ii) a second torque transmitting device of the seven torque transmitting devices; wherein a sixth connecting member of the plurality of connecting members connects the third planetary gear set sun gear with a first torque transmitting device of the seven torque transmitting devices, the first torque transmitting device continuously connected to the input member and wherein a seventh connecting member of the plurality of connecting members connects the third planetary gear set carrier with the fourth planetary gear set ring gear.

In addition the foregoing, the described transmission may include one or more of the following features: wherein an eighth connecting member of the plurality of connecting members connects the third planetary gear set carrier with a sixth torque transmitting device of the seven torque transmitting devices; wherein a ninth connecting member of the plurality of connecting members connects the first torque transmitting device and the sixth connecting member with a seventh torque transmitting device of the seven torque transmitting devices; wherein a tenth connecting member of the plurality of connecting members connects the third planetary gear set sun gear with the fourth planetary gear set sun gear; and wherein an eleventh connecting member of the plurality of connecting members connects the fourth planetary gear set carrier with a third torque transmitting member of the seven torque transmitting devices.

In addition the foregoing, the described transmission may include one or more of the following features: a hybrid module coupled to the input member, a gearbox coupled to the hybrid module and the output member, wherein the hybrid module includes an electric motor underdriven by a module planetary gear set, a disconnect clutch coupled to the module planetary gear set and selectively to the transmission input member, which forms an input to the hybrid module, a launch clutch coupled for common rotation with the disconnect clutch and selectively to an output of the hybrid module, which forms an input to the gearbox, and a vibration absorber coupled for common rotation with the launch clutch.

Further areas of applicability of the teachings of the present application will become apparent from the detailed description, claims and the drawings. It should be understood that the detailed description, including disclosed embodiments and drawings referenced therein, are merely exemplary in nature intended for purposes of illustration only and are not intended to limit the scope of the present application, its application or uses. Thus, variations that do not depart from the gist of the present application are intended to be within the scope of the present application.

BRIEF DESCRIPTION OF DRAWINGS

FIG. 4 is a table illustrating example clutch application and shift sequences for the example transmission of FIG. 3, in accordance with the principles of the present application;

FIG. 6 is a table illustrating example clutch application and shift sequences for the example transmission of FIG. 5, in accordance with the principles of the present application;

FIG. 8 is a table illustrating example clutch application and shift sequences for the example transmission of FIG. 7, in accordance with the principles of the present application.

DESCRIPTION

Figure 1:
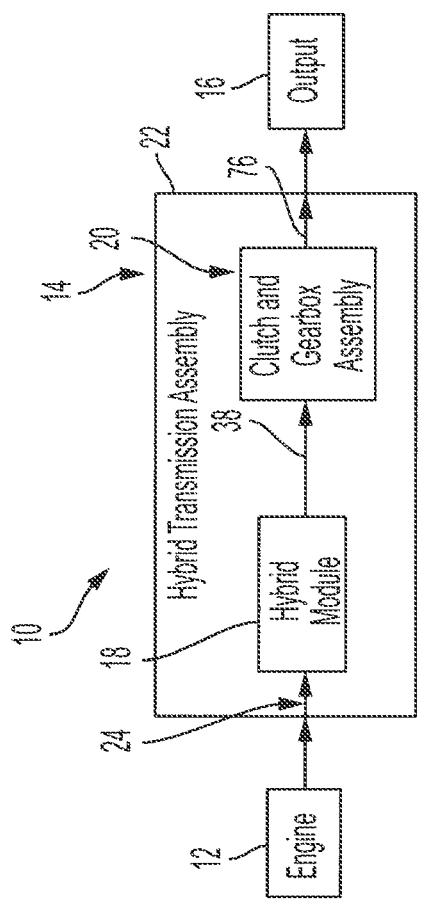
FIG. 1 is schematic illustration of an example hybrid powertrain having a hybrid automatic transmission assembly in accordance with the principles of the present application.

With initial reference to FIG. 1, a hybrid powertrain for use in a motor vehicle is generally shown and indicated at 10. The hybrid powertrain 10 includes an engine or prime mover 12, a hybrid automatic transmission assembly 14, and an output 16 to a driveline including a final drive unit (not specifically shown). In the example implementation, the hybrid transmission assembly 14 may be referred to as a "P2" type hybrid automatic transmission assembly/arrangement and includes a hybrid module 18 coupled to a clutch and gearbox assembly 20, both of which are housed, among other components of transmission assembly 14, inside a transmission housing 22. Although described herein as a hybrid powertrain and hybrid automatic transmission assembly, it will be appreciated that the systems and features described herein are not limited to hybrid systems and may be utilized in various other types of powertrains and transmission systems.

As will be described in more detail, the transmission assembly 14 described herein is configurable or convertible from a 9-speed transmission (FIG. 3) to an 8-speed transmission (FIG. 5) or a 6-speed transmission (FIG. 7) by removal of one or more transmission components. In the same way, the transmission assembly 14 is convertible from a lower speed to a higher speed transmission by addition of the one or more transmission components. As such, the present disclosure provides a single transmission assembly capable of being converted into any one of a six, eight, or nine speed variant, thereby enabling the transmission assembly to be used across a wider range of vehicles and avoiding the cost and complexity associated with developing individual transmission assemblies for multiple different vehicles.

In the example embodiment, the hybrid transmission assembly 14 includes various forward speeds/gears and reverse gears (depending on the variation), and is configured for an all-wheel drive/rear wheel drive vehicle arrangement. Moreover, the hybrid automatic transmission assembly 14 is configured to operate in various modes, including an electric vehicle (EV) mode, an engine on only mode, a battery charging at vehicle stop mode, and a hybrid mode (engine plus electric machine on mode).

Figure 2:
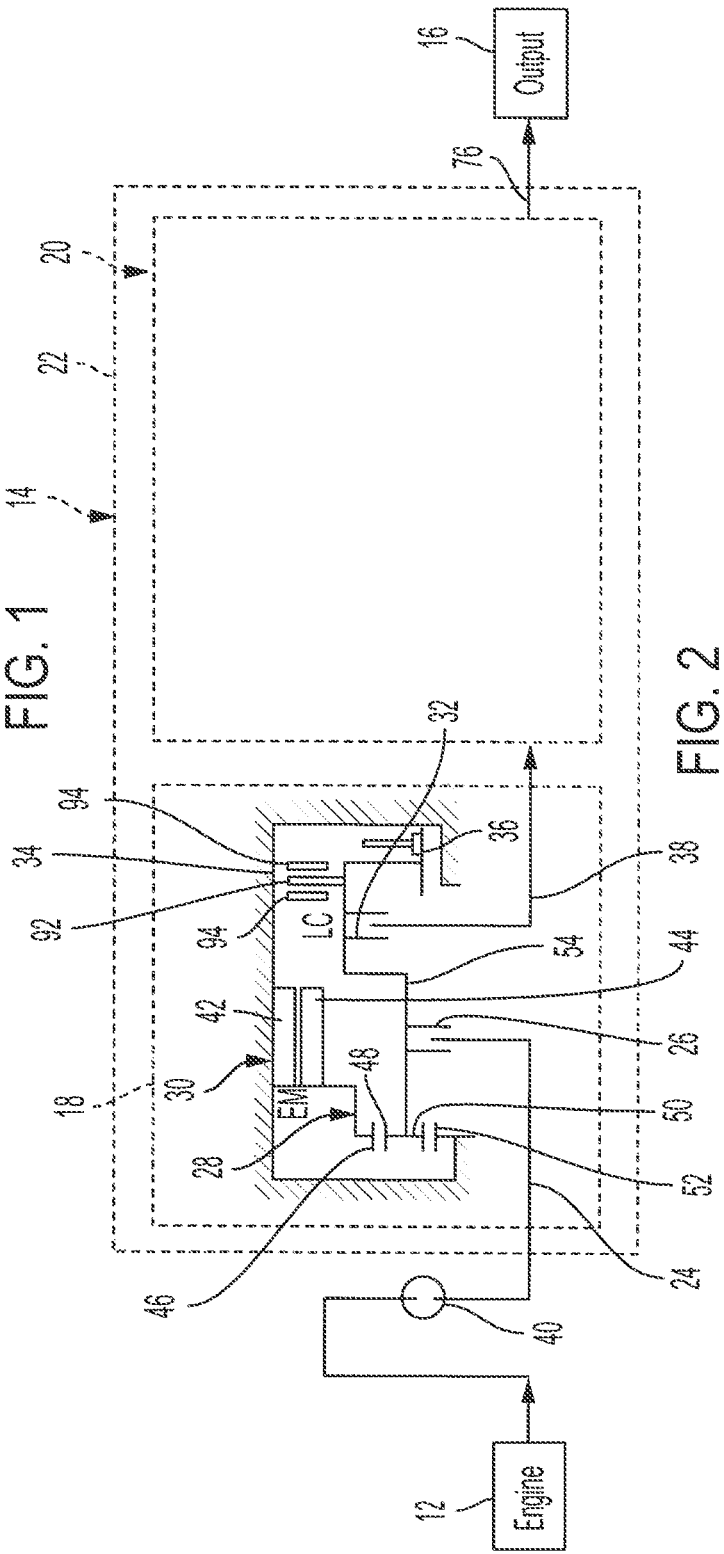
FIG. 2 is an example schematic illustration of the example hybrid automatic transmission assembly of FIG. 1, in accordance with the principles of the present application.

FIG. 2 provides additional detail of the hybrid module 18, which is illustrated disposed between the engine 12 and clutch and gearbox assembly 20. In the example embodiment, the hybrid module 18 includes an input 24, a disconnect clutch 26, a planetary gear set 28, an electric motor or machine 30, a launch clutch 32, a vibration absorber 34, a pump 36, and an output 38. A damper system 40 is also provided between the engine and the hybrid module 18. In the example implementation, the input 24 to the hybrid module 18 forms an input to the hybrid automatic transmission assembly 14. Similarly, the output 38 of the hybrid module 18 forms an input to the clutch and gearbox assembly 20, and may also be referenced as the transmission input shaft. Also in this implementation, the output 38 (or transmission input shaft) forms the only torque carrying connection between the hybrid module 18 and the clutch and gearbox assembly 20. In other implementations, the clutch and gearbox assembly 20 merely receives rotational output from an engine output shaft via a torque converter assembly (not shown).

In one example implementation, the electric machine 30 is coupled to the planetary gear set 28 such that the electric machine 30 is underdriven by the planetary gear set 28. This planetary gear reduction provides for, among other benefits and features, reducing the size of the electric machine or motor 30, thereby providing for a smaller size transmission package and a reduction in mass of the transmission. In one example, this planetary gear set 28 is a simple planetary gear set.

The electric machine 30 generally includes a stator 42 and a rotor 44. In one exemplary implementation, the stator 42 includes a plurality of windings or phases and is secured to a stationary member, such as the transmission housing 22. The rotor 44 includes a plurality of magnets and/or ferromagnetic members and is disposed radially inwardly of the stator 42. However, it will be appreciated that the rotor 44 may also comprise other construction configurations.

In the illustrated example, the rotor 44 of the electric machine or motor 30 is coupled to a ring gear 46 of planetary gear set 28, which is coupled through pinion gears 48 to a carrier 50, which is coupled through the pinion gears to the sun gear 52. The carrier 50 is coupled to a connecting shaft or member 54, to which the disconnect and launch clutches 26, 32 are separately, non-rotatably connected. In one example implementation, the disconnect and launch clutches 26, 32 are connected to the connecting shaft in a serial arrangement with the launch clutch 32 being downstream (further from the engine 12) of the disconnect clutch 26 but upstream of the centrifugal pendulum absorber (CPA) 34 and pump 36, which are also connected to the connecting member 54. The sun gear 52 of the planetary gear set 28 is connected to ground, such as the transmission housing 22.

With additional reference to FIG. 3, the 9-speed configuration of transmission assembly 14 will be described in more detail. In the example 9-speed variation, the clutch and gearbox assembly 20 includes four planetary gear sets and seven shift or torque transferring elements configured to be selectively controlled to generate nine forward gears or speed ratios and two reverse gears or speed ratios, as will be discussed in greater detail below. In the example embodiment, the four planetary gear sets are planetary gear sets including a first planetary gear set 60, a second planetary gear set 62, a third planetary gear set 64, and a fourth planetary gear set 66 associated with transmission housing 22. In one example implementation, the four planetary gear sets are separate, simple planetary gear sets arranged generally spaced apart from each other along a longitudinal length of the automatic transmission 14. In this way, none of the gears of one planetary gear set are shared with or form a gear of another one of the four planetary gear sets. In the example embodiment, the four planetary gear sets are close coupled planetary gear sets that each generally include a sun gear 'S', a carrier 'CR' supporting planet gears, and a ring gear 'R', as will also be discussed below in greater detail.

The four planetary gear sets of the clutch and gearbox assembly 20 are interconnected in connection with the seven shift elements (e.g., torque transmitting devices). In the example embodiment, the seven shift elements include four clutches and three brakes. In particular, the transmission 14 includes a first rotating clutch 'C1', a second rotating clutch 'C2', a third rotating clutch 'C3', and a fourth rotating clutch 'C4', as well as a first brake 'B1', a second brake 'B2', and a third brake 'B3'. In one example implementation, second brake 'B2' can be a controllable selectable one way clutch (SOWC) 68.

Figure 3:
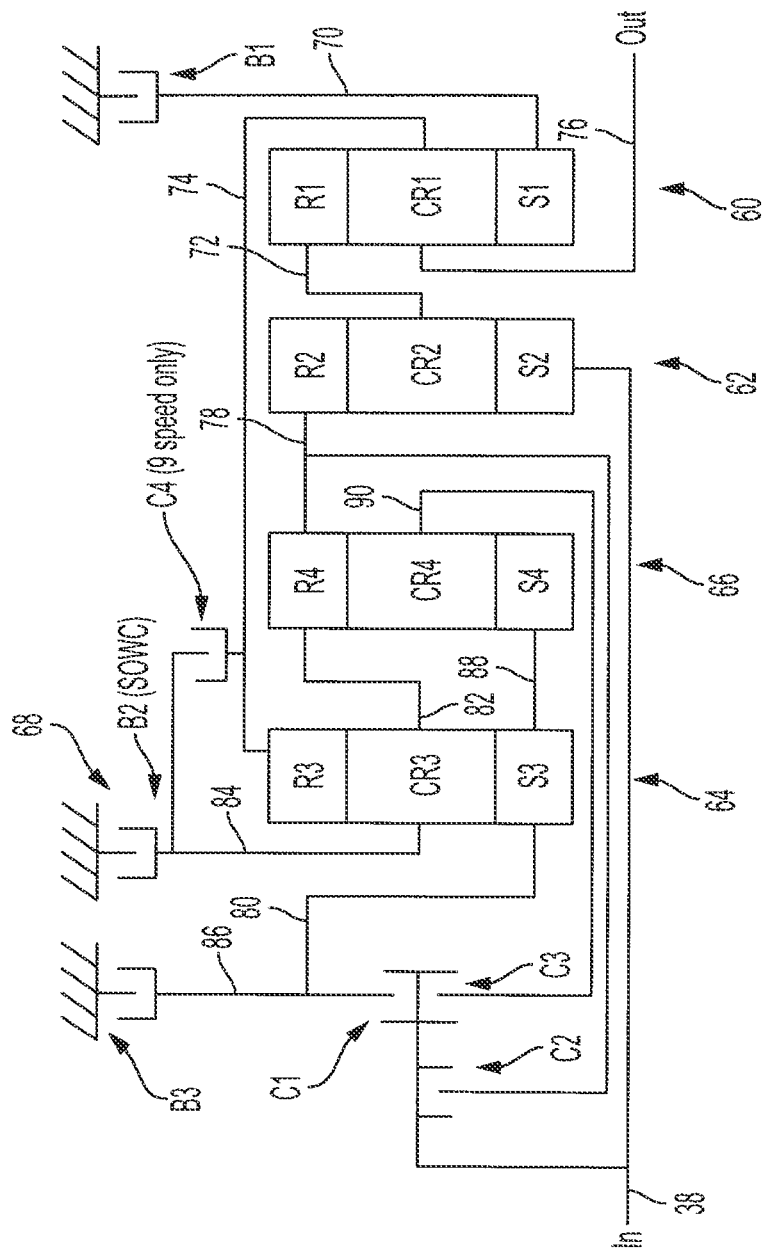
FIG. 3 is a schematic illustration of an example transmission that may be utilized in the transmission assembly of FIG. 2 and in a 9-speed configuration, in accordance with the principles of the present application.

With continued reference to FIG. 3, in one example implementation, the first planetary gear set 60 is positioned between the transmission output 16 and the second planetary gear set 62, and the sun gear 'S1' is connected for common rotation with a first connecting member 70 that is connected to brake 'B1'. The ring gear 'R1' is connected for common rotation with a second connecting member 72, and the carrier 'CR1' is connected for common rotation with third and fourth connecting members 74, 76. The third connecting member 74 is connected to clutch 'C4' and ring gear 'R3'. The fourth connecting member 76 is connected for common rotation with the output shaft 16 of the transmission 14.

In the example embodiment, the second planetary gear set 62 includes sun gear 'S2', which is connected for common rotation with the transmission input shaft 38, as briefly discussed above. The ring gear 'R2' is connected for common rotation with a fifth connecting member 78, and the carrier 'CR2' is connected for common rotation with the second connecting member 72.

In the example embodiment, the third planetary gear set 64 is positioned between the fourth planetary gear set 66 and the hybrid module 18, and the sun gear 'S3' is connected for common rotation with a sixth connecting member 80, which is connected to rotating clutch 'C1'. The ring gear 'R3' is connected for common rotation with the third connecting member 74, and the carrier 'CR3' is connected for common rotation with a seventh connecting member 82 and an eighth connecting member 84. The fifth connecting member 78 is connected to rotating clutch 'C2'. The eighth connecting member 84 is connected to brake 'B2', which is optionally a SOWC. A ninth connecting member 86 connects the first rotating clutch 'C1' and the sixth connecting member 80 to brake 'B3'.

With continued reference to FIG. 3, in the example embodiment, the fourth planetary gear set 66 is positioned between the second and third planetary gear sets 62, 64, and the sun gear 'S4' is connected for common rotation with a tenth connecting member 88, which is connected to sun gear 'S3'. The ring gear 'R4' is connected for common rotation with the fifth connecting member 78 and the seventh connecting member 82, and the carrier 'CR4' is connected for common rotation with an eleventh connecting member 90, which is connected to rotating clutch 'C3'.

As briefly discussed above, the torque transmitting devices provide for selective interconnection of shafts or connecting members, members of the four gearbox planetary gear sets and/or the transmission housing. For example, rotating clutch 'C' is selectively engageable to connect the sixth connecting member 80 with the transmission input shaft 38, the rotating clutch 'C2' is selectively engageable to connect the fifth connecting member 78 with the transmission input shaft 38, and the rotating clutch 'C3' is selectively engageable to connect the eleventh connecting member 90 with the transmission input shaft 38. The rotating clutch 'C4' is selectively engageable to connect the third connecting member 74 with the eighth connecting member 84.

In the example embodiment, the third brake 'B3' is selectively engageable to connect the ninth connecting member 86 and the sixth connecting member 80 to the transmission housing 22 so as to restrict the ninth and sixth connecting member (which can be one member) from rotating relative thereto. The second brake 'B2', in the form of a SOWC, is selectively engageable to connect the eighth connecting member 84 to the transmission housing 22 so as to restrict the eighth connecting member 84 from rotating relative to transmission housing 22 in a first rotational direction. The first brake 'B1' is selectively engageable to connect the first connecting member 70 to the transmission housing 22 so as to restrict the first connecting member 70 from rotating relative thereto. It will be appreciated by those skilled in the art that the transmission includes other features and components for use in its overall operation.

With continued reference to FIG. 2, the disconnect and launch clutches 26, 32 will now be discussed in greater detail in connection with general operation of the hybrid automatic transmission assembly 14. In one exemplary implementation and as briefly discussed above, the launch clutch 32 and the disconnect clutch 26 are separate clutches, controlled by a controller or the like, and are connected in series for common rotation with the same shaft or connecting member 54 associated therewith. This shaft or connecting member 54 is coupled to the carrier of the electric machine planetary gear set 28 at one end and to the centrifugal pendulum absorber 34 and a pump sprocket 36 downstream of the launch clutch 32 and proximate to and/or at the other end thereof.

The disconnect clutch 26 is controllable via a controller or the like to selectively engage and disengage the engine 12 and electric machine 30 and associate planetary gearing 20 from the remainder of the transmission 14. In other words, it can be controlled to disconnect the electric machine 30, gear set 28 and clutch and gearbox assembly 20 from the engine 12. The disconnect clutch 26 may also be utilized for improved noise vibration and harshness (NVH). For example, the disconnect clutch 26 may be controlled to be slipped, as needed, to mitigate NVH inputs, such as during an electric vehicle (EV) mode.

The launch clutch 32 is a separate and separately selectively engageable clutch from the disconnect clutch 26 and provides for, among other modes and control features, battery charging. For example, the launch clutch 32 can be controlled to separate the clutch and gearbox assembly 20 from the electric machine 30 and gear set 28 while keeping the disconnect clutch 26 selectively engaged so as to use the engine 12 and electric machine 30 independently of the remainder of the transmission 14 to charge the associated battery (not shown) of the vehicle (not shown).

Returning to the above-discussed vehicle operating modes, and with reference to use of the disconnect and launch clutches 26, 32, in EV mode, the disconnect clutch 26 is controlled to be off or disengaged and the launch clutch 32 is controlled to be engaged or on. In the engine only operating mode, both the launch clutch 32 and the disconnect clutch 26 are controlled to be engaged. For charging the battery when the vehicle is stopped or stationary, the disconnect clutch 26 is controlled to be engaged and the launch clutch 32 is controlled to be disengaged. In the hybrid mode of operation where both the electric machine 30 and the engine 12 are providing propulsive torque, both the disconnect clutch 26 and the launch clutch 32 are controlled to be engaged. In one exemplary implementation, both the disconnect and launch clutches 26, 32 are rotating clutches. In one exemplary implementation, the launch clutch 32 provides robust cooling capacity as a rotating clutch and the disconnect clutch 26 is provided in a wet disconnect clutch layout.

Turning now to the SOWC 68, this clutch is locked with torque capacity for first gear and the two reverse gears, and in an overrun configuration for second to sixth gears. For example, the SOWC 68 provides a locked mode for reverse gear and manual first gear engine braking. The SOWC 68, in the normal mode, provides passive control of the release and apply of the clutch to improve the first to second and second to first shift feel of the transmission. Use of the SOWC 68 as discussed above and in place of a conventional clutch brake and/or conventional one-way clutch also reduces drag and improves fuel economy.

As briefly discussed above, the damper system of the hybrid automatic transmission assembly 14 includes a separate mass elastic damper 40 and a separate vibration absorber 34. In one exemplary implementation, the vibration absorber 34 is a centrifugal pendulum absorber (CPA). In the exemplary implementation illustrated, the centrifugal pendulum absorber 34 is positioned in the transmission housing 22 after the disconnect clutch of the hybrid module 18. In one exemplary implementation, the location is also at or after the launch clutch 32. In this configuration, the mass damper 40 is positioned on the primary side and the centrifugal pendulum absorber is positioned inside of the transmission housing 22, on the secondary side, where it is both protected and lubricated. In one exemplary implementation, the CPA 34 is directly connected to the launch clutch 32 and includes a cam 92 coupled to the launch clutch 32 and pendulums 94 movably coupled to the cam 92.

Placement of the centrifugal pendulum absorber 34 on the motorized side of the P2 system improves performance during stop/start cycles, which require careful cycle management. Separating the damper 40 also provides for more design flexibility of the damper 40 and better pre-conditioning of the input signal ahead of the centrifugal pendulum absorber 34. Inclusion of the centrifugal pendulum absorber 34 also provides for superior conditioning of the torque signature in hybrid electric vehicle (HEV) mode.

FIG. 4 illustrates an exemplary shift pattern of the nine-speed variation of automatic transmission 14. The table illustrates the combination of clutches and brakes engageable to achieve specific torque input-to-output ratios. In the example table, each clutch and brake combination corresponds to one of nine forward gear speeds and two reverse speeds. The shift pattern illustrates example transmission ratios of the individual gear steps, as well as the gear increments and step changes. In this particular transmission, two shift elements are engaged for every gear, as represented by the circles in the table cells.

Figure 5:
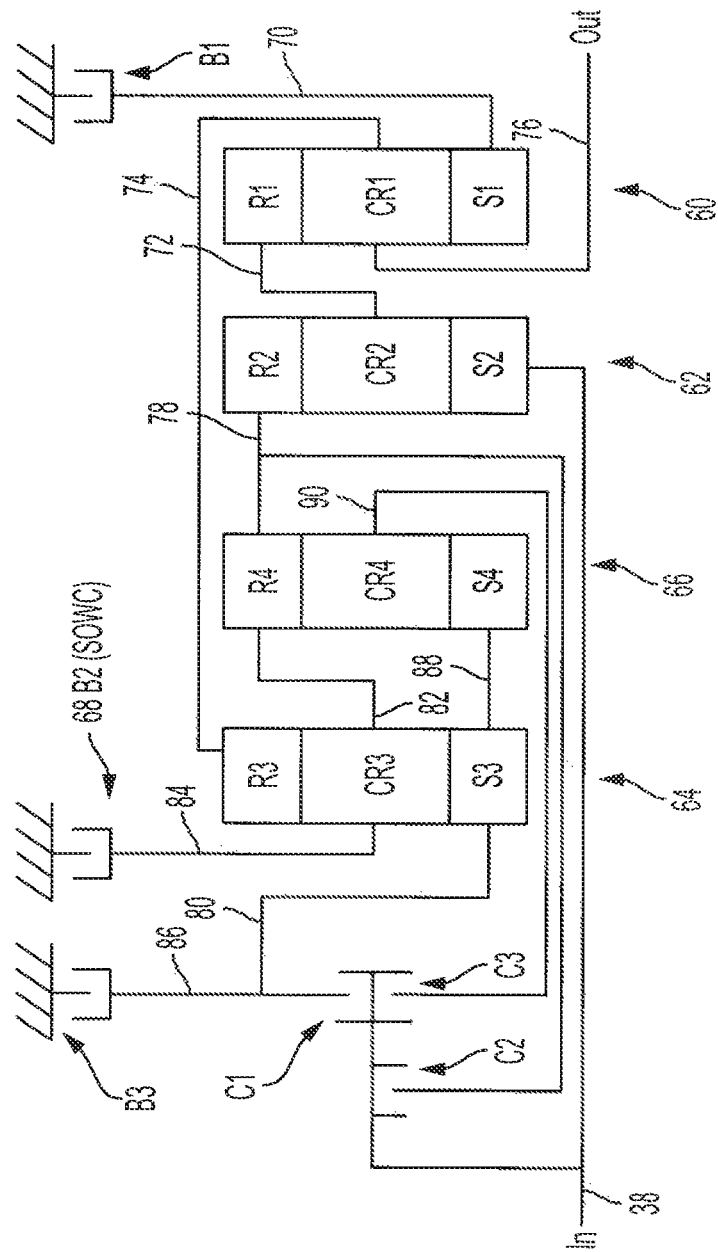
FIG. 5 is a schematic illustration of the transmission of FIG. 3 in an example 8-speed configuration, in accordance with the principles of the present application.

FIG. 5 illustrates automatic transmission assembly 14 converted to one example 8-speed variation by removing rotating clutch 'C4' from the clutch and gearbox assembly 20.

Similar to the 9-speed configuration, in the example 8-speed configuration, the first planetary gear set 60 includes sun gear 'S1', which is connected for common rotation with the first connecting member 70 that is connected to brake 'B1'. The ring gear 'R1' is connected for common rotation with second connecting member 72, and carrier 'CR1' is connected for common rotation with third and fourth connecting members 74, 76. The third connecting member 74 is connected to ring gear 'R3', and the fourth connecting member 76 is connected for common rotation with the output shaft 16 of the transmission 14.

In the example embodiment, the second planetary gear set 62 includes sun gear 'S2', which is connected for common rotation with the transmission input shaft 38. The ring gear 'R2' is connected for common rotation with fifth connecting member 78, and the carrier 'CR2' is connected for common rotation with the second connecting member 72.

In the example embodiment, the third planetary gear set 64 includes sun gear 'S3', which is connected for common rotation with the sixth connecting member 80, which is further connected to rotating clutch 'C1'. The ring gear 'R3' is connected for common rotation with the third connecting member 74, and the carrier 'CR3' is connected for common rotation with the seventh connecting member 82 and eight connecting member 84. The fifth connecting member 78 is connected to rotating clutch 'C2'. The eighth connecting member 84 is connected to brake 'B2', which is optionally a SOWC. The ninth connecting member 86 connects the first rotating clutch 'C1' and the sixth connecting member 80 to brake 'B3'.

As illustrated in FIG. 5, in the example embodiment, the fourth planetary gear set sun gear 'S4' is connected for common rotation with the tenth connecting member 88, which is connected to sun gear 'S3'. The ring gear 'R4' is connected for common rotation with the fifth connecting member 78 and the seventh connecting member 82, and the carrier 'CR4' is connected for common rotation with the eleventh connecting member 90, which is connected to rotating clutch 'C3'.

Similar to the 9-speed configuration discussed above, in the 8-speed configuration, the torque transmitting devices provide for selective interconnection of shafts or connecting members, members of the four gearbox planetary gear sets and/or the transmission housing. However, unlike the 9-speed configuration, the 8-speed configuration does not require rotating clutch 'C4', thereby reducing parts and complexity.

FIG. 6 illustrates an exemplary shift pattern of the eight-speed variation of automatic transmission 14. The table illustrates the combination of clutches and brakes engageable to achieve specific torque input-to-output ratios. In the example table, each clutch and brake combination corresponds to one of eight forward gear speeds and two reverse speeds. The shift pattern illustrates example transmission ratios of the individual gear steps, as well as the gear increments and step changes. In this particular transmission, two shift elements are engaged for every gear, as represented by the circles in the table cells.

Figure 7:
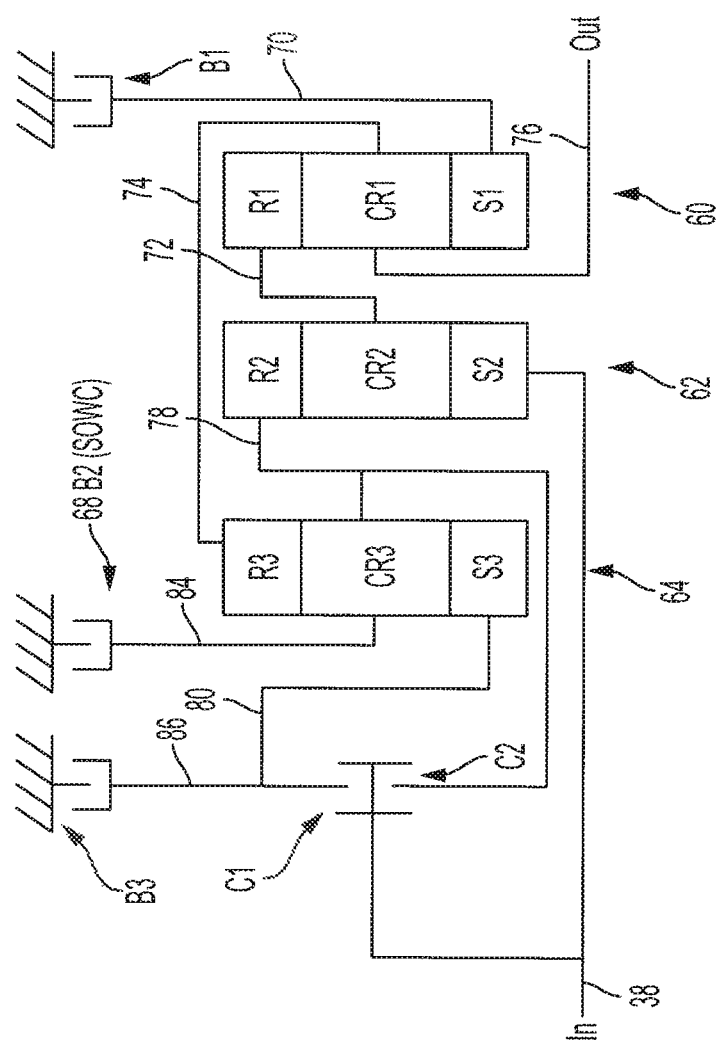
FIG. 7 is a schematic illustration of the transmission of FIG. 2 in an example 6-speed configuration, in accordance with the principles of the present application.

FIG. 7 illustrates automatic transmission assembly 14 converted to one example 6-speed variation by removing the fourth planetary gear set 66 and rotating clutches 'C3' and 'C4' from the clutch and gearbox assembly 20.

In the example 6-speed configuration, the first planetary gear set 60 includes sun gear 'S1', which is connected for common rotation with the first connecting member 70 that is connected to brake 'B1'. The ring gear 'R1' is connected for common rotation with second connecting member 72, and carrier 'CR1' is connected for common rotation with third and fourth connecting members 74, 76. The third connecting member 74 is connected to ring gear 'R3', and the fourth connecting member 76 is connected for common rotation with the output shaft 16 of the transmission 14.

In the example embodiment, the second planetary gear set 62 includes sun gear 'S2', which is connected for common rotation with the transmission input shaft 38. The ring gear 'R2' is connected for common rotation with fifth connecting member 78, and the carrier 'CR2' is connected for common rotation with the second connecting member 72.

In the example embodiment, the third planetary gear set 64 includes sun gear 'S3', which is connected for common rotation with the sixth connecting member 80, which is in turn connected to rotating clutch 'C1'. The ring gear 'R3' is connected for common rotation with the third connecting member 74, and the carrier 'CR3' is connected for common rotation with the fifth connecting member 78 and the eighth connecting member 84. The fifth connecting member 78 is connected to rotating clutch 'C2', and the eighth connecting member 84 is connected to brake 'B2', which is optionally a SOWC. The ninth connecting member 86 connects the first rotating clutch 'C1' and the sixth connecting member 80 to brake 'B3'.

Like the other variations, the torque transmitting devices provide for selective interconnection of shafts or connecting members, members of the three gearbox planetary gear sets and/or the transmission housing. However, unlike the 9-speed configuration, the 6-speed configuration does not include rotating clutches 'C3' and 'C4' as well as the fourth planetary gear set 66.

FIG. 8 illustrates an exemplary shift pattern of the six-speed variation of automatic transmission 14. The table illustrates the combination of clutches and brakes engageable to achieve specific torque input-to-output ratios. In the example table, each clutch and brake combination corresponds to one of six forward gear speeds and one reverse speed. The shift pattern illustrates example transmission ratios of the individual gear steps, as well as the gear increments and step changes. In this particular transmission, two shift elements are engaged for every gear, as represented by the circles in the table cells.

Described herein are systems and methods for providing a single automatic transmission assembly configurable between 9-speed, 8-speed, and 6-speed variations. The 9-speed variation includes four simple gearsets, four rotating clutches, and three brake clutches. One brake clutch may be configured as a selectable one way clutch. The 9-speed automatic transmission assembly is converted to the 8-speed variation by eliminating the fourth rotating clutch. The 9-speed automatic transmission assembly is converted to the 6-speed variation by eliminating the fourth planetary gear set and the third and fourth rotating clutches. Advantageously, the 9-speed architecture does not require dog clutches. Moreover, the multi-configurable transmission assembly described herein provides improved gearing efficiencies and low clutch spinloss, thereby delivering competitive fuel economy even with conventional clutches, as well as providing low component speeds resulting in quick downshifts.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A modular hybrid transmission for a vehicle configurable between a 9-speed, an 8-speed and a 6-speed configuration, the transmission comprising:
   a housing;
   an input member and an output member;
   first, second, third, and fourth planetary gear sets each having first, second, and third elements;
   seven torque transmitting devices each selectively engageable to interconnect one of the first, second, and third elements of one of the planetary gear sets directly with (i) one of the first, second, and third elements of another one of the planetary gear sets, (ii) the housing, or (iii) the input member; and
   a plurality of connecting members each connecting one of the first, second, and third members of one of the planetary gear sets directly with another one of the first, second, and third members of another one of the planetary gear sets or with one of the torque transfer devices,
   wherein the seven torque transmitting devices are selectively engageable in combinations of two with the four planetary gear sets to establish nine forward speed ratios and at least one reverse speed ratio, and
   wherein upon removal of only a fourth torque transmitting device of the seven torque transmitting devices, the transmission is arranged in the 8-speed configuration and the remaining six torque transmitting devices are selectively engageable in different combinations of two with the four planetary gear sets to establish eight forward speed ratios and at least one reverse speed ratio.

2. The transmission of claim 1, wherein the transmission is further configurable into the 6-speed configuration upon removal of (i) a third torque transmitting device of the seven torque transmitting devices, (ii) the fourth torque transmitting device, and (iii) the fourth planetary gear set, and
   wherein in the 6-speed configuration, the remaining five torque transmitting devices are selectively engageable in combinations of two with the three remaining planetary gear sets to establish six forward speed ratios and at least one reverse speed ratio.

3. The transmission of claim 1, wherein the planetary gear set first members are sun gears, the planetary gear set second members are carriers, and the planetary gear set third members are ring gears.

4. The transmission of claim 1, wherein the seven torque transmitting devices comprise:
   four rotating clutches; and
   three brake clutches.

5. The transmission of claim 4, wherein the fourth torque transmitting device is one of the four rotating clutches.

6. The transmission of claim 4, wherein one of the three brake clutches is a selectable one way clutch.

7. The transmission of claim 3, wherein a first connecting member of the plurality of connecting members connects the first planetary gear set sun gear to a fifth torque transmitting device of the seven torque transmitting devices.

8. The transmission of claim 7, wherein a second connecting member of the plurality of connecting members connects the first planetary gear set ring gear with the second planetary gear set carrier.

9. The transmission of claim 8, wherein a third connecting member of the plurality of connecting members connects the first planetary gear set carrier with the fourth torque transmitting device.

10. The transmission of claim 9, wherein a fourth connecting member of the plurality of connecting members connects the first planetary gear set carrier with the output member.

11. The transmission of claim 10, wherein a fifth connecting member of the plurality of connecting members connects the second planetary gear set ring gear with (i) the fourth planetary gear set ring gear, and (ii) a second torque transmitting device of the seven torque transmitting devices.

12. The transmission of claim 11, wherein a sixth connecting member of the plurality of connecting members connects the third planetary gear set sun gear with a first torque transmitting device of the seven torque transmitting devices, the first torque transmitting device continuously connected to the input member.

13. The transmission of claim 12, wherein a seventh connecting member of the plurality of connecting members connects the third planetary gear set carrier with the fourth planetary gear set ring gear.

14. The transmission of claim 13, wherein an eighth connecting member of the plurality of connecting members connects the third planetary gear set carrier with a sixth torque transmitting device of the seven torque transmitting devices.

15. The transmission of claim 14, wherein a ninth connecting member of the plurality of connecting members connects the first torque transmitting device and the sixth connecting member with a seventh torque transmitting device of the seven torque transmitting devices.

16. The transmission of claim 15, wherein a tenth connecting member of the plurality of connecting members connects the third planetary gear set sun gear with the fourth planetary gear set sun gear.

17. The transmission of claim 16, wherein an eleventh connecting member of the plurality of connecting members connects the fourth planetary gear set carrier with a third torque transmitting member of the seven torque transmitting devices.

18. The transmission of claim 1, further comprising:
   a hybrid module coupled to the input member;
   a gearbox coupled to the hybrid module and the output member; and
   the hybrid module including:
      an electric motor underdriven by a module planetary gear set;
      a disconnect clutch coupled to the module planetary gear set and selectively to the transmission input member, which forms an input to the hybrid module;
      a launch clutch coupled for common rotation with the disconnect clutch and selectively to an output of the hybrid module, which forms an input to the gearbox; and
      a vibration absorber coupled for common rotation with the launch clutch.

19. The transmission of claim 1, wherein the at least one reverse speed ratio is two reverse speed ratios.

* * * * *